(12) United States Patent
Alberts et al.

(10) Patent No.: US 12,168,972 B2
(45) Date of Patent: Dec. 17, 2024

(54) REDUCTION OF A PITCH BEARING DAMAGE

(71) Applicant: Siemens Gamesa Renewable Energy A/S, Brande (DK)

(72) Inventors: Johannes Gerhardes Wardjan Alberts, Brøndby Strand (DK); Gustav Hoegh, Vejle (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/022,561

(22) PCT Filed: Aug. 18, 2021

(86) PCT No.: PCT/EP2021/072878
§ 371 (c)(1),
(2) Date: Feb. 22, 2023

(87) PCT Pub. No.: WO2022/043144
PCT Pub. Date: Mar. 3, 2022

(65) Prior Publication Data
US 2023/0323865 A1    Oct. 12, 2023

(30) Foreign Application Priority Data
Aug. 28, 2020    (EP) .................................... 20193415

(51) Int. Cl.
*F03D 80/70* (2016.01)
*F03D 7/02* (2006.01)
*F03D 17/00* (2016.01)

(52) U.S. Cl.
CPC ........... *F03D 80/70* (2016.05); *F03D 7/0224* (2013.01); *F03D 17/00* (2016.05); *F05B 2260/83* (2013.01); *F05B 2270/328* (2013.01)

(58) Field of Classification Search
None
See application file for complete search history.

(56) References Cited

U.S. PATENT DOCUMENTS

2011/0142620 A1    6/2011   Loh et al.
2020/0056586 A1 *  2/2020   Ehlers .................. F03D 7/0224

FOREIGN PATENT DOCUMENTS

EP           2728178 A1        5/2014
WO    WO-2018153518 A1 *    8/2018  ........... F03D 7/0224
WO        2020029324 A1      2/2020

OTHER PUBLICATIONS

PCT International Search Report and Written Opinion of International Searching Authority mailed Dec. 3, 2021 corresponding to PCT International Application No. PCT/EP2021/072878 filed Aug. 18, 2021.

\* cited by examiner

*Primary Examiner* — Juan G Flores
(74) *Attorney, Agent, or Firm* — Schmeiser, Olsen & Watts LLP

(57) ABSTRACT

A method of determining a value of a pitch speed for a pitch actuator of at least one rotor blade of a wind turbine includes: providing a quantity being indicative of a value of a bearing moment of the rotor blade; determining the value of a pitch speed based on the quantity and a reference quantity indicative of a reference value of the bearing moment of the rotor blade such that, if the quantity indicates that the value of a bearing moment of the rotor blade is below the reference value of the bearing moment of the rotor blade, the value of a pitch speed is determined to be above a reference value of the pitch speed.

15 Claims, 3 Drawing Sheets

REDUCTION OF A PITCH BEARING DAMAGE

CROSS-REFERENCE TO RELATED APPLICATIONS

Figure 1:
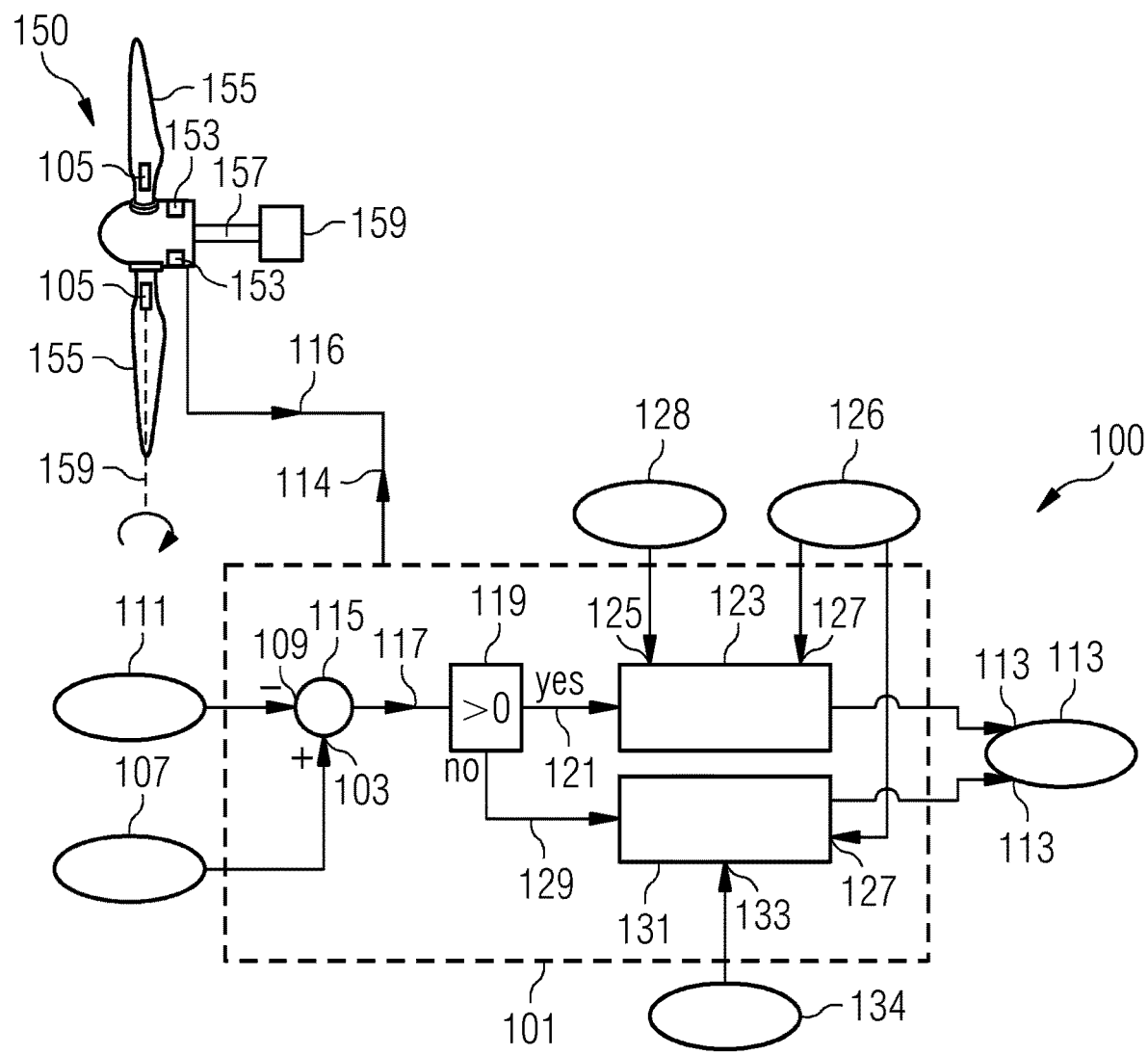

This application claims priority to PCT Application No. PCT/EP2021/072878, having a filing date of Aug. 18, 2021, which claims priority to EP Application No. 20193415.5, having a filing date of Aug. 28, 2020, the entire contents both of which are hereby incorporated by reference.

FIELD OF TECHNOLOGY

The following relates to a method and to an arrangement of determining a value of a pitch speed for a pitch actuator of at least one rotor blade of a wind turbine. Furthermore, the following relates to a method of controlling a pitch actuator, relates to a pitch actuating system and further relates to a wind turbine including the pitch adjustment system.

BACKGROUND

A rotor blade of a conventional wind turbine may be rotated around a longitudinal axis of the rotor blade in order to adjust a so-called pitch angle. Varying the pitch angle may be necessary during normal operation of the wind turbine for producing electric energy in order to increase or decrease the lift as caused by the rotor blade due to impacting wind. In order to facilitate pitching the rotor blade, the rotor blade is rotatably supported by a pitch bearing. While pitching the rotor blade, more or less damage to the pitch bearing may be induced in particular depending on the moment the rotor blade is subjected and also the pitch travel or pitch speed, i.e., the speed with which the pitch angle is adjusted (for example given in degrees per second). In the technical field, the pitch bearing damage (PBD) indicates the damage induced on the pitch bearing raceway. Thereby, rolling elements, such as cylinders or balls, roll on raceway surfaces. If the pressure applied between the rolling elements and the raceway (caused by the bending moment) is relatively high, the raceway and/or the rolling elements may be damaged. The pitch bearing damage is conventionally known to be a function of a pitch travel (dθ) and blade resultant moment ($M_{res}$).

The document US 2020/0056586 A1 discloses a method for load reduction on wind turbine blade pitch bearings, wherein a method includes to pitch the rotor blade towards a target blade pitch angle, wherein the manner of pitching depends on a load on a pitch bearing and/or an azimuthal position of the rotor. For example, the speed of pitching may be set depending on the load on the pitch bearing. When the bearing moment is relatively high, the pitch travel may be reduced and the pitching may be disabled in a range where the bearing moment is relatively high.

According to a prescribed function, a pitch speed multiplicative factor may be set, i.e. a scaling factor according to which the pitch rotational speed is adapted.

Conventionally, the problem of pitch bearing damage has been solved or attacked by
 lowering the optimal pitch angle to lower pitch bearing damage;
 lowering the speed-pitch controller gains,
 or increase capability of capacity of the pitch bearings.

All these solutions have particular disadvantages. Conventional methods and arrangements for reducing pitch bearing damage may increase the pitch speed at a relatively high bending moment which may cause potential damage to the pitch bearing. In other conventional methods, a deviation between the actual pitch angle and a target pitch angle may be relatively high such that the control of the wind turbine is deteriorated.

Thus, there may be a need for a method and a corresponding arrangement of determining a value of a pitch speed for a pitch actuator of at least one rotor blade of a wind turbine, wherein the pitch bearing damage may be reduced and furthermore the blade can rapidly and reliably be set at a target pitch angle, thereby improving operability of the wind turbine.

SUMMARY

According to an embodiment of the present invention it is provided a method of determining a value of a pitch speed for a pitch actuator of at least one rotor blade of a wind turbine, the method comprising: providing a quantity being indicative of a value of a bearing moment of the rotor blade; determining the value of a pitch speed based on the quantity and a reference quantity indicative of a reference value of the bearing moment of the rotor blade such that, wherein, if the quantity indicates that the value of a bearing moment of the rotor blade is below the reference value of the bearing moment of the rotor blade, the value of a pitch speed is determined to be above a reference value of the pitch speed.

It should be understood, that features, individually or in any combination, disclosed for a method of determining a value of a pitch speed of a pitch actuator of at least one rotor blade of a wind turbine, may, individually or in any combination, also applied to or provided for an arrangement for determining a value of a pitch speed according to embodiments of the present invention and vice versa.

The method may partly be implemented in software and/or hardware. The method may for example be performed by a wind turbine controller or a module of a pitch actuator system.

The pitch speed may denote the speed with which the pitch angle is adjusted, as is for example determined as a derivative (or differential quotient) of the pitch angle as a function of time. The pitch speed may for example be expressed as pitch travel (measured for example in degrees) per time interval.

The pitch actuator may for example include an electric motor which may be configured to turn the rotor blade around a longitudinal axis. The pitch actuator may act on the root of the blade. The wind turbine may for example comprise in total three rotor blades. Core elements of the method may for example be performed by an arithmetic/logical processor.

Determining the quantity indicative of a value of a bearing or bending moment may include one or more measurements and further processing of measurement results. The bending or bearing moment may indicate the mechanical load the rotor blade or the pitch bearing is subjected to. The bending or bearing moment may be due to gravity and/or impacting wind. The bending or bearing moment may act on the pitch bearing. Thus, considering the bending or bearing moment may appropriately enable to protect the pitch bearing from damage.

The reference quantity indicative of a reference value of the bending or bearing moment may also comprise one or more measurements and processing the measurement results. The reference quantity indicative of the reference value of the bending or bearing moment may be embodied in different manners in different embodiments. Furthermore, the quantity being indicative of the value of the bending or bearing moment may be embodied in different manners in different embodiments according to the present invention.

If the quantity indicates that the value of the bending or bearing moment of the rotor blade is below the reference value of the bending or bearing moment of the rotor blade, the pitch bearing may not substantially be damaged, even if the pitch speed is determined and then set to be above the reference value of the pitch speed.

The reference value of the pitch speed may for example correspond to a rated pitch speed, a normal pitch speed or a pitch speed which can be applied during the normal expected lifetime of the pitch bearing, in case that the bending or bearing moment is not above the reference value of the bending or bearing moment. Thus, it may not impose any risk of pitch bearing damage, if the rotor blade is pitched with a pitch speed above a reference value of the pitch speed, if the bending or bearing moment of the rotor blade is below the reference value of the bending or bearing moment. When the pitch speed is determined to be above the reference speed of the pitch speed, a potential pitch offset or deviation of the actual pitch angle from a target pitch angle may rapidly be decreased. The target pitch angle may relate to or may be an intended pitch angle, as for example dictated by other control equipment, for example a wind turbine controller.

In particular, starting from an actual pitch speed, the pitch speed may be increased to be above a reference value of the pitch speed, if it is determined that the bending or bearing moment is below the reference value of the bending or bearing moment of the rotor blade.

The method may output the determined value of the pitch speed. This pitch speed may be in any signal form supplied for example to a pitch actuator which is mechanically coupled to the rotor blade.

When the quantity indicative of the value of the bending or bearing moment is not greater than the reference quantity indicative of the reference value of the bending or bearing moment, the pitch speed may be increased based on how low the bearing moment fluctuation goes below the mean level, i.e. on how low the actual bearing moment is below the reference bearing moment.

The bearing moment may for example be calculated from a bending moment of the rotor blade. The bending moment of the rotor blade may in turn be calculated based on strain measurement results as obtained for example by one or more strain sensors arranged close to or at the root section of the rotor blade. From the quantity, for example a bending moment and/or a bearing moment may be derived. However, in other embodiments, also the azimuthal condition or position of the rotor blade may be indicative of the value of the bearing moment of the rotor blade. In the aforementioned embodiments, the quantity may be different from a quantity which is related to the azimuthal position of the rotor blade.

Thereby, the actual pitch angle may rapidly and reliably be set to a target pitch angle while at the same time risk of pitch bearing damage may be reduced.

According to an embodiment of the present invention, the value of a pitch speed is determined based on a parameter related to a low value of a bearing moment ($\Delta M\_low$), wherein the parameter related to a low value of a bearing moment ($\Delta M\_low$) indicates at which bearing moment the value of the pitch speed should be a maximal value of the pitch speed.

The parameter related to a low value of the bearing moment may not have been used or introduced in conventional methods. The maximal value of the pitch speed may be set for example depending on the actuator used and also depending on considerations of the bearing moment which leads together with the maximum value of the pitch speed to a particular expected pitch bearing damage. By introduction of the parameter related to a low value of the bearing moment, the implementation may be simplified.

According to an embodiment of the present invention, the value of the pitch speed is determined to be the maximal value ($v\_max$) of the pitch speed at $M<=M\_ref-\Delta M\_low$, wherein M is the value of the bearing moment, $M\_ref$ is the reference value of the bearing moment, $\Delta M\_low$ is the parameter related to a low value of a bearing moment.

Starting from the reference bearing moment decreased by the low value of the bearing moment, the pitch speed may linearly be decreased (with increasing bending or bearing moment) starting from the maximal value of the pitch speed. If the reference value of the bearing moment is reached, the value of the pitch speed may amount to the reference value of the pitch speed. For still increasing bearing moments, the pitch speed may further linearly be decreased in order to reach a minimum value of the pitch speed at a high bearing moment limit as will be explained below.

According to an embodiment of the present invention, if the quantity indicates that the value of a bearing moment of the rotor blade is above a reference value of the bearing moment of the rotor blade, the value of the pitch speed is determined to be below the reference value of the pitch speed.

If the bending or bearing moment is above the reference value of the bearing moment, turning the rotor blade with too high pitch speed may induce substantial damage which may be avoided according to this embodiment of the present invention. In particular, it may be ensured that for both, for increasing bearing moment or for decreasing bearing moment, the pitch speed is always below the reference value of the pitch speed, if the bearing moment is above the reference value of the bearing moment. Thereby, damage of the pitch bearing may effectively be reduced or even avoided.

According to an embodiment of the present invention, if the quantity indicatives decrease of the value of a bearing moment with time and if the quantity indicates that the value of a bearing moment of the rotor blade is above the reference value of the bearing moment of the rotor blade, the value of the pitch speed is determined to increase with time (in order to catch up to a target pitch angle), in particular from a minimal speed value, such that the value of the pitch speed is below a reference value of the pitch speed.

Conventionally, the pitch speed may have been increased too much in the region, wherein the value of the bearing moment of the rotor blade is above the reference value of the bearing moment. Thereby, conventionally, high damage may have been imposed to the pitch bearing.

This high damage or high load to the pitch bearing may be avoided by this embodiment of the present invention. Nevertheless, the value of the pitch speed is increased with time for decreasing value of the bending moment with time in order to ensure a fast compliance with a set target pitch angle. Thereby, the pitch speed is held to be below the reference value of the pitch speed, in order to avoid potential pitch bearing damage.

According to an embodiment of the present invention, if the quantity indicatives increase of the value of a bearing moment with time and if the quantity indicates that the value of a bearing moment of the rotor blade is above the reference value of the bearing moment of the rotor blade, the value of the pitch speed is determined to decrease with time such that the value of the pitch speed is below a reference value of the pitch speed. In the above embodiment, the increase of the pitch speed may be proportional to the decrease of the value of the bending moment with time. In other embodiments, different relationships between the increase of the pitch speed and the decrease of the bending moment may be applied.

For determined increasing bearing moment, the pitch speed is decreased with time, in order to avoid substantial damage of the pitch bearing. The decrease of the pitch speed may be proportional to the increase of the value of the bending moment.

Thereby, high flexibility may be provided and serving appropriately the purpose on one hand reducing pitch bearing damage and on the other hand to closely adhere to an intended target pitch angle.

According to an embodiment of the present invention, for increase and/or decrease of the value of the bearing moment with time the value of a pitch speed is determined to be above the reference value of the pitch speed, if the quantity indicates that the value of a bearing moment of the rotor blade is below the reference value of the bearing moment of the rotor blade.

When the pitch speed is set or determined to be above the reference value of the pitch speed, the pitch angle may rapidly reach the target pitch angle. Since the bearing moment is below the reference value of the bearing moment, the pitch speed may be increased above the reference value of the pitch speed, without involving the risk of substantial damage to the pitch bearing.

According to an embodiment of the present invention, the value of a pitch speed is determined to vary with the value of a bearing moment as a curve having negative derivative, in particular for values of the bearing moment above and/or below the reference value of the bearing moment.

A curve having negative derivative may be a curve of any shape also different from a linear curve. A curve having negative derivative may define the higher the bearing moment, the lower the value of the pitch speed as determined. Thereby, a simple implementation is provided. The curve can be adapted for example based on simulations of physical/mathematical models including a model of the pitch bearing depending on the pitch travel and the bearing moment.

According to an embodiment of the present invention, the curve is a straight line having a slope that is, in particular dynamically, calculated such that v=v_max for M=M_low and v=v_min for M=M_high wherein M_low=M_ref−ΔM_low, M_high=M_ref+ΔM_high, M is the value of the bearing moment, v is the value of a pitch speed, v_max is a maximal value of the pitch speed, v_min is a minimal value of the pitch speed, M_ref is the reference value of the bearing moment, ΔM_low, ΔM_high are predetermined parameters related to bearing moment limits.

A straight line provides a simple implementation. The slope of the straight line may be defined for example by merely defining two points in a coordinate system having as an x-axis the bearing moment and as a y-axis the pitch speed. Any of the above-defined quantities may thereby be included, as is applicable and as required depending on the particular application. For example, the straight line may define the value of the pitch speed to be the reference value of the pitch speed for the reference value of the bearing moment. For the reference value of the bearing moment decreased by the parameter related to the low bearing moment, the pitch speed may amount to the maximal value of the pitch speed, for example. For the bearing moment being the sum of the reference value of the bearing moment and the parameter related to the high bearing moment, the value of the pitch speed may amount to the minimal value of the pitch speed.

According to an embodiment of the present invention, the reference value of the bearing moment of the rotor blade is a predetermined value or a mean of values of bearing moments of all rotor blades of the wind turbine; and/or wherein the reference value of the pitch speed is a predetermined value of the pitch speed or a mean of values of the pitch speed of all rotor blades of the wind turbine.

When the reference value of the bearing moment is determined as a mean of values of the bearing moments of all rotor blades of the wind turbine, a dynamic reference bearing moment is provided which takes into account the particularities of the rotor blades and pitching system as employed.

In other embodiments it may be meaningful to define a predetermined value of a bearing moment which may be set depending on the ratings of the pitch bearing such that the predetermined value may define a value of a bearing moment which should not be exceeded, in order to avoid damage of the bearing.

The reference speed of the pitch speed as well as the reference value of the bending or bearing moment may be determined in a particular combination, since both may contribute to the pitch bearing damage. The reference value of the pitch speed may for example also be determined based on the capability of the pitch actuator system. Combinations of reference value of the bearing moment as well as the reference value of the pitch speed may be determined such as to result in a pitch bearing damage which is acceptable or which lies in a predetermined damage range or load range.

For example, several strain sensors may be installed at a root section of the respective rotor blade. The strain sensors may perform measurements with a sample rate for example between 100 and 1000 measurements per second. The strain may for example vary according to the rotational speed of the rotor of the rotor blade. The strain may in particular be relatively high during an upswing or downswing of the considered rotor blade due to gravitation. For example, two flap sensors and two edge sensors may be utilized. The measurement results of those sensors may be received by a processor and may be converted to respective bending or bearing moments of the rotor blade. Furthermore, a bending amount or out of plane bending may be calculated. From the original sensors and/or further parameters, a bearing moment acting on the pitch bearing may be derived.

The azimuthal position of the rotor blade may be indicative of the bearing moment, since the azimuthal position also indicates when the rotor blade is at a downswing or at the lowest position. Depending on the application, the strain value, the bending moment value, the bearing moment value and/or the azimuthal position may be combined to reach at a quantity being indicative of the value of the bearing moment of the rotor blade. The bearing moment may act on the pitch bearing.

According to an embodiment of the present invention it is provided a method of controlling a pitch actuator, the method comprising: supplying a signal indicative of a target pitch angle to the pitch actuator; performing a method of determining a value of a pitch speed for the pitch actuator of at least one rotor blade of a wind turbine according to any of the preceding embodiments; supplying a signal indicative of the determined value of the pitch speed to the pitch actuator; and adjusting, by the pitch actuator, the rotor blade pitch angle based on the target pitch angle and the determined value of the pitch speed.

Thereby, an improved method for controlling the pitch actuator is provided. Thereby, pitch bearing damage may be reduced and the desired pitch angle may be set in a relatively short time thereby improving operability of the wind turbine.

According to an embodiment of the present invention it is provided an arrangement for determining a value of a pitch speed for a pitch actuator of at least one rotor blade of a wind turbine, the arrangement comprising: a processor, adapted: to receive a quantity being indicative of a value of a bearing moment of the rotor blade; to determine the value of a pitch speed based on the quantity and a reference quantity indicative of a reference value of the bearing moment of the rotor blade such that, wherein, if the quantity indicates that the value of a bearing moment of the rotor blade is below the reference value of the bearing moment of the rotor blade, the value of a pitch speed is determined to be above a reference value of the pitch speed.

Furthermore, it is provided according to an embodiment of the present invention a pitch adjustment system, comprising: an arrangement for determining a value of a pitch speed for a pitch actuator of at least one rotor blade of a wind turbine according to the preceding embodiment; a pitch actuator communicatively coupled to the arrangement; in particular further comprising at least one sensor, in particular strain sensor, adapted to determine the quantity being indicative of the value of the bearing moment of the rotor blade.

Finally, according to an embodiment of the present invention it is provided a wind turbine, comprising: a turbine rotor having plural rotor blades attached; and a pitch adjustment system according to the preceding embodiment.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which embodiments of the invention is not limited.

BRIEF DESCRIPTION

Figure 2:
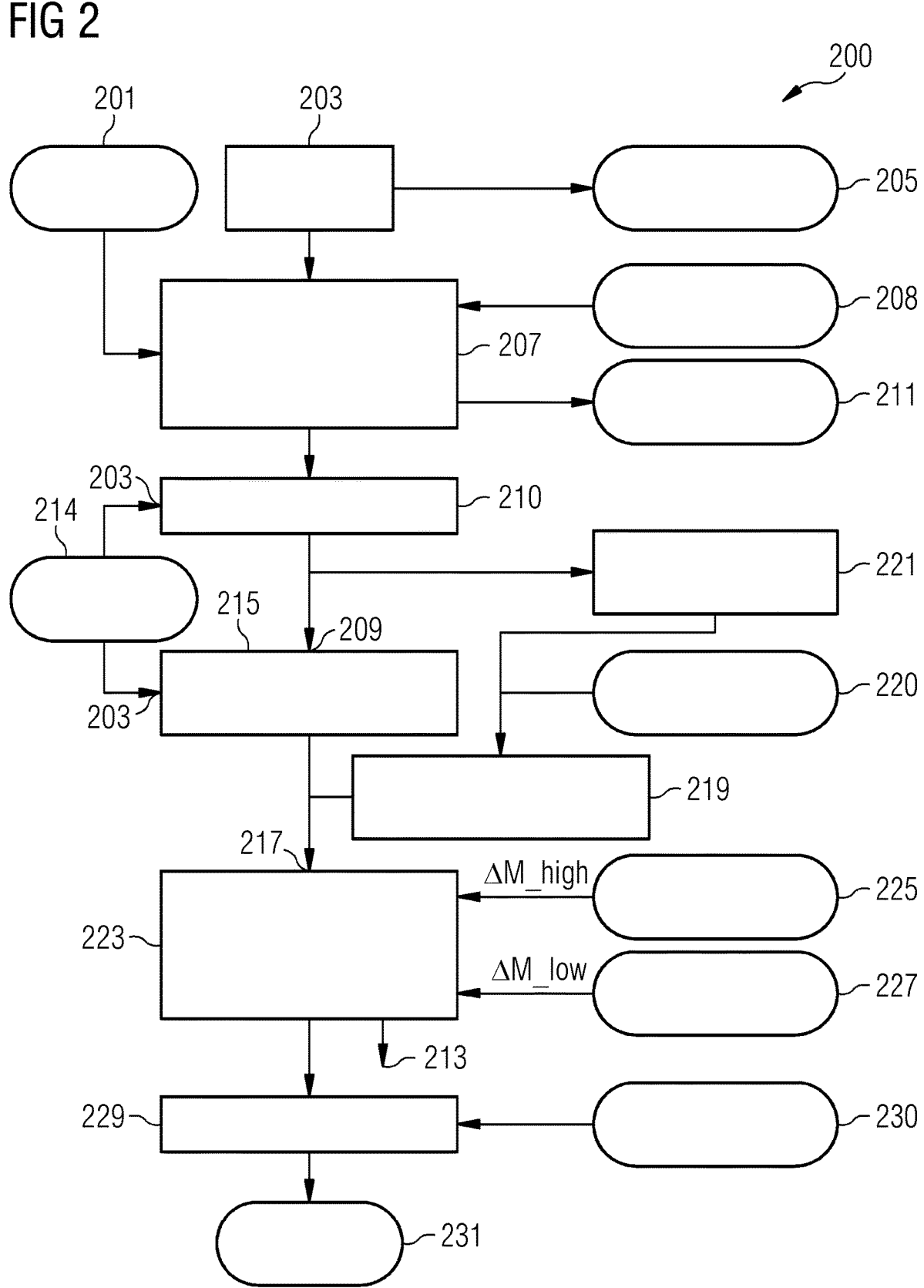
Figure 3:
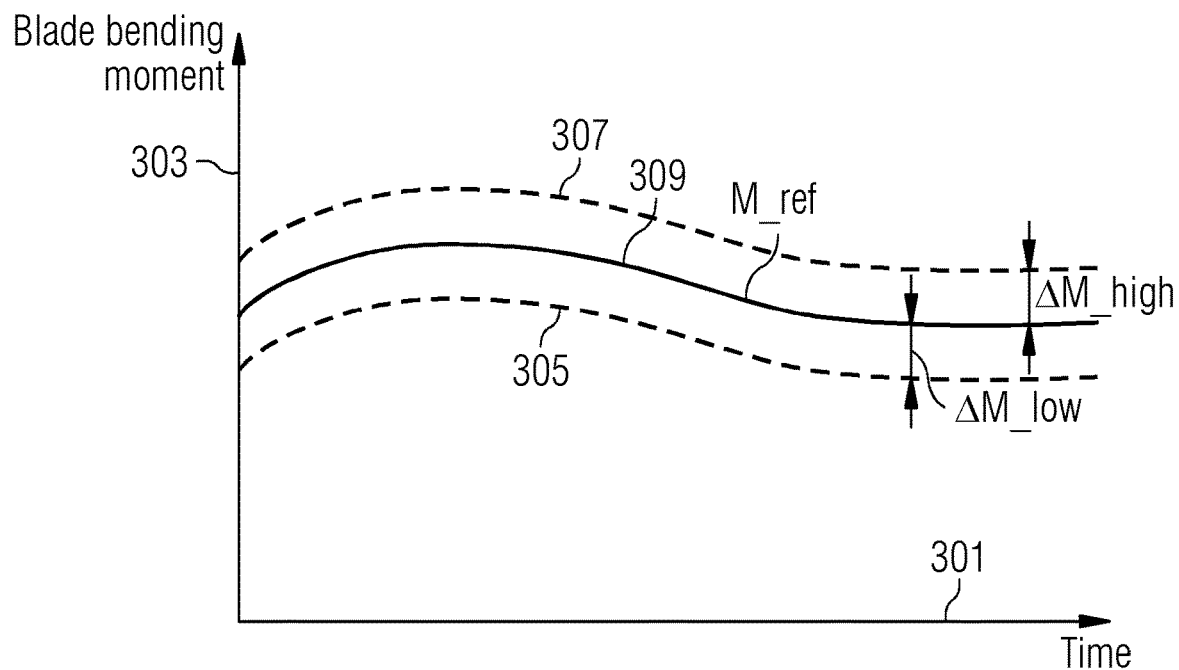
Figure 4:
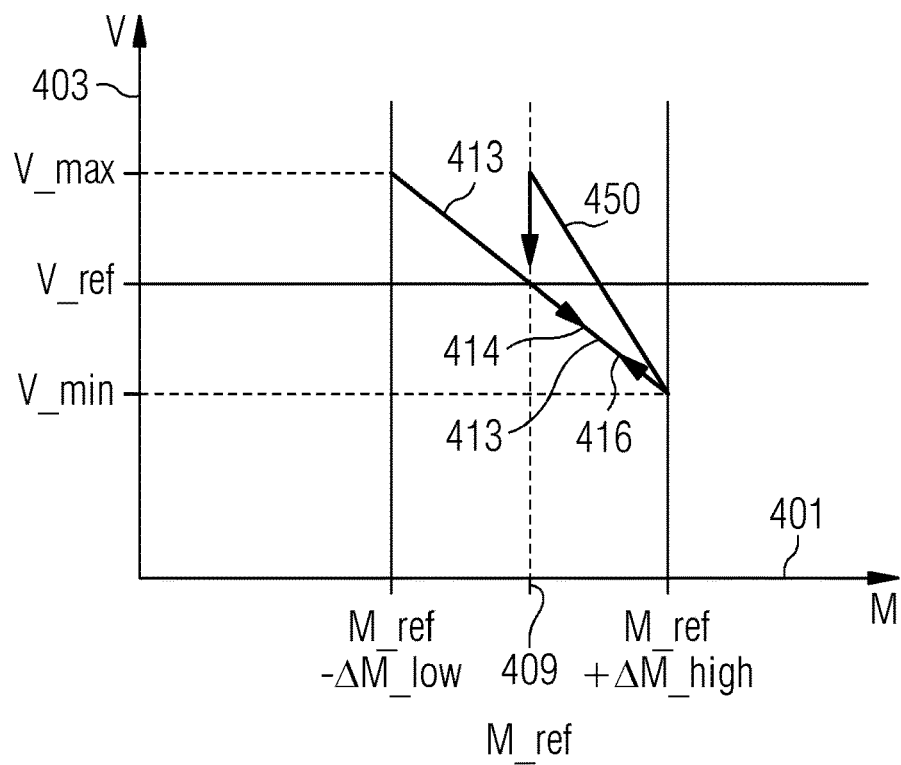

Some of the embodiments will be described in detail, with reference to the following figures, wherein like designations denote like members, wherein:

FIG. 1 schematically illustrates a wind turbine according to an embodiment of the present invention including an arrangement for determining a value of a pitch speed for a pitch actuator of at least one rotor blade according to an embodiment of the present invention;

FIG. 2 schematically illustrates a scheme of a method of determining a value of a pitch speed for a pitch actuator according to an embodiment of the present invention, as is for example performable by the arrangement illustrated in FIG. 1;

FIG. 3 illustrates a graph illustrating parameters as employed in embodiments according to the present invention; and FIG. 4 schematically illustrates a graph for explaining parameters as utilized for determining a value of a pitch speed according to an embodiment of the present invention.

DETAILED DESCRIPTION

The wind turbine 150 illustrated in FIG. 1 comprises an arrangement 100 for determining a value of a pitch speed for a pitch actuator 153 of at least one rotor blade 155 of the wind turbine 150. The rotor blade 155 is mechanically coupled to a rotor 157 which drives a generator 159 of the wind turbine 150. The arrangement 100 is communicatively coupled to each of the pitch actuators 153 for each wind turbine 155. The pitch actuator 153 is capable of turning the respective rotor blade 155 around a longitudinal axis 159. The arrangement 100 outputs a control signal 114 to the actuator 153 which may indicate the value of the pitch speed 113. The arrangement 100 receives measurement values 116 regarding strain from strain sensors 105.

The wind turbine 150 includes the rotor blades 155, the rotor 157, the pitch actuators 153 as well as the generator 159. The wind turbine 150 may further comprise other mechanical and electronic and electric equipment not illustrated in detail.

In conventional methods it has been observed that the pitch speed is too high, when the pitch bearing moment is at relatively high values. Embodiments of the present invention avoid this disadvantageous behaviour.

The arrangement 100 schematically illustrated in FIG. 1 for determining a value of a pitch speed for a pitch actuator of at least one rotor blade of the wind turbine 150 comprises a processor 101 which is adapted to receive a quantity being indicative of a value of a bending moment of the rotor blade, wherein the quantity is labelled with reference sign 103. In the current embodiment, the quantity 103 is or represents an instant bearing moment of the rotor blade under consideration. The instant bearing moment may for example be determined based on measurement values of a strain sensor 105. And processing the signal from the strain sensor 105 installed at a blade 155 using a calculation module 107. The module 107 may also be considered as an input module which provides the instant bearing moment of the considered rotor blade.

The processor 101 is further adapted to achieve a reference value 109 of a bearing moment of the considered rotor blade from a further input module 111. In the embodiment as illustrated in FIG. 1, the reference value of the bearing moment 109 equals the mean (or average) of bearing moments of all rotor blades of the wind turbine. For example, each rotor blade may comprise respective strain sensors which may provide measurement signals regarding strain of the respective rotor blade. From the strain values, respective input modules 107, 111 may calculate a bending moment of the respective rotor blade and from this the bearing moment. Furthermore, the input module 111 may perform an average of all bearing moments of all rotor blades to calculate the reference value 109 of the bearing moment.

The processor is adapted to determine the value of the pitch speed (labelled with reference sign 113) based on the quantity 103 and the reference quantity 109 of the bearing moment. Thereby, the value of the pitch speed 113 is calculated such that, if the quantity 103 indicates that the value of the bending moment of the rotor blade is below the reference value 109 of the bending moment of the rotor blade, the value 113 of the pitch speed is determined to be above a reference value of the pitch speed.

Therefore, the processor 101 comprises a subtraction element (for example implemented in software and/or hardware) 115 which determines the difference 117 between the quantity 103 and the reference quantity 109. The difference 117 is supplied to a logical element 119 which checks whether the difference 117 is larger than zero or not larger than zero. If the difference is larger than zero, the method switches into the branch 121 leading to a first computational module 123 which computes the pitch speed reduction of the considered rotor blade. For that, the calculation module 123 receives a parameter 125 related to a bending moment high limit, also denoted in the following as ΔM_high. Further, the calculation module 123 receives a collective pitch speed 127 (from module 126) which may for example be a reference value of a pitch speed. The reference value 127 of the pitch speed may amount to a predetermined pitch speed, a normal pitch speed or for example a mean of pitch speeds of all rotor blades. The parameter 125 related to a bending moment high limit is provided by a block 128, for example a storage block. The collective pitch speed 127 or reference pitch speed 127 is provided by a module 126.

Depending on the parameter 125 related to a bearing moment high limit, the reference value of the pitch speed 127 as well as the check of difference 121 in block 119, the calculation module 123 calculates the pitch speed for the considered rotor blade for the considered case, that the difference 117 is greater than zero.

In the other case, if the difference 117 is not larger than zero, the method switches to a branch 129 leading to a second calculation block 131. The calculation block 131 computes the pitch speed increase for the considered rotor blade further based on a parameter 133 (also denoted ΔM_low in the following) related to a bearing moment low limit as provided by the module 134. The parameter 133 may not have been utilized in conventional art methods. Based on the difference 117 as well as on the parameter 133 related to the bearing moment low limit, the calculation module 131 finally calculates the value of the pitch speed 113. Thereby, also the collective pitch speed or reference pitch speed 127 is considered.

Problems of conventional methods for reducing pitch bearing damage include that high amount of pitch travel is scheduled at the mean out-of-plane moment but a mean out-of-plane moment that is lower than the instantaneous out-of-plane moment means that there must be out-of-plane moments that is lower than the mean. This means that there is a too high damage contribution than necessary due to the conventional catchup behaviour. The out-of-plane moment may be proportional to the bending moment or bearing moment.

Embodiments of the present invention use the pitch bearing damage by performing the "catchup" below the mean out-of-plane moment instead of at the mean level. By performing the "catchup" proportional to the difference between the mean and the instantaneous out-of-plane moments, most of the pitch travel performs at the lowest bearing load, thereby reducing pitch bearing damage more than conventionally applied.

When slowing down the pitch speed (by adding a pitch offset to the collective reference) it should be based on the out-of-plane moment. The increase in pitch speed to catch up should be based on the out-of-plane moment below the mean level, and until this point the individual pitch speed for the blade is kept at the lowest speed it has seen during (like a latch) or maintain the distance by freezing the pitch offset and then catch up proportional below the mean level. This proportionality can be given by a gain indicated in the FIG. 2 below.

The FIG. 2 illustrates a schematic scheme of a method of determining a value of a pitch speed according to an embodiment of the present invention which may for example be performed by the arrangement 100 illustrated in FIG. 1.

In a module 201, the method 200 provides input signals, such as the momentary states of all wind turbines. A selection block 203 enables to select the type of the pitch damage attenuation (PDA). The block 205 provides output signals in the case none of a predetermined type of PDA is selected by the module 203. The output module 205 may for example output the states and pitch offsets of all wind turbines as zero.

In case a type selection is enabled in module 203, in a method block 207 sensor status is checked. Furthermore, several control statuses are checked. In particular, the maximum pitch speed may be set and some other parameters may be set, for example read from storage elements. The module 207 receives input parameters from a block 208. The input parameters may for example relate to repetition scale, limit values or limits. The module 207 outputs in a block 211 an output signal, such as a PDA status.

In a method block 210, the mean pitch bearing moment is calculated as a mean of the bearing moments of all three rotor blades. The mean bearing 209 is output as a reference value 210 of the bearing moment. Thereby, an input module 214 provides a quantity of a value of a bending moment of a considered rotor blade. In the illustrated embodiment, the input signals provided by the module 214 relate to the bearing moments of all rotor blades which are also provided to the calculation block 210 in order to calculate the mean 209 (or reference) of those bearing moments.

The method block 215 receives the reference value 209 of the bearing moment as well as the value of the bearing moment 203 of a considered rotor blade calculates the difference 217 between those two input parameters. The difference may also be considered as a bearing fluctuation of a considered pitch bearing relative to the mean of the pitch bearings.

A multi-rate low pass filter 219 receives from an activation function module 221 a PDA activation level and from module 220 input parameters regarding filtering and allows activation level to decrease fast and increase slow (i.e. deactivate fast, activate slow).

The pitch bearing fluctuation 217 is provided or supplied to a calculation block 223 which calculates pitch rate limitation, the pitch rate limitation for each blade is calculated using the moment fluctuations, the filtered activation level and the maximum pitch rate limit. Therefore, the module 223 receives an input parameter ΔM_high from a method block 225. Furthermore, from a method block 227, the pitch rate limitation calculation block 223 receives a parameter ΔM_low, as will be explained below with reference to FIGS. 3 and 4.

Based on the difference 217 or the pitch bearing fluctuation 217 and the parameters ΔM_high, ΔM_low relating to bending moment limits or bearing moment limits, the pitch rate limitation calculation module 223 calculates the value 213 of the pitch speed of all rotor blades.

A further method block 229 calculates the pitch offsets using the pitch rate limitation and the difference between the individual pitch position and the collective pitch reference considering max pitch offset form module 230. Thereby, the calculation module 229 receives further input parameters regarding maximal pitch offsets.

An output block 231 outputs the pitch offsets for the different wind turbines. In the method scheme 200 illustrated in FIG. 2, the catchup of the pitch speed is performed proportional to the bearing moment below the mean moment. This proportionality is parameterized by the parameter ΔM_low which is the moment below the mean moment where the catchup speed is maximal.

The FIG. 1 illustrates the arrangement for determining the pitch speed also to illustrate the catchup of the pitch speed or the pitch angle towards the collective pitch position. Thereby, the pitch speed reduction is computed based on the moment fluctuation above mean. When that fluctuation reaches mean level, the pitch speed shall be identical to the collective pitch speed, keeping the offset constant. Then, when the bearing fluctuation goes below zero, the pitch speed increase is computed based on how low the bearing moment fluctuation goes below the mean level. Due to pitch speed increase it may be possible to catch up with the collective pitch angle.

FIG. 3 illustrates in a coordinate system having as an abscissa 301 the time and as an ordinate 303 the blade bending moment or the blade bearing moment, a first curve 309 indicating the mean of the bending moment or bearing moment of all three blades as developing over time representing a reference bending or bearing moment. This curve 309 may dynamically be calculated. The upper curve 307 is calculated by adding to the mean curve 309 the parameter ΔM_high, thus the parameter relating to the bearing moment high limit. The lower curve 305 is obtained by subtracting from the mean curve 309 the parameter ΔM_low, i.e., the parameter related to the bearing moment low limit.

Conventionally, pitch travel is limited above the upper line 307. As soon as the moment drops below the upper limit 307, the pitch angle can catch up in a conventional method. According to an embodiment of the present invention, catchup will not be allowed until the bending moment or the bearing moment is below the curve 305, i.e., below the mean bearing moment 309 diminished by the parameter ΔM_low, i.e. the parameter as indicated in FIG. 2, for example, as well as in FIG. 1.

FIG. 4 illustrates in a coordinate system having as an abscissa 401 the bearing moment or the bending moment M and having as an ordinate 403 the pitch speed v, the dependence of the pitch speed of the bearing moment or bending moment M depicted as a curve 413 representing the value of the pitch speed.

It is noted that the signal 113 indicating the value of the pitch speed, the signal 103, indicating the quantity indicative of the bearing moment, the signal 109 indicating the quantity indicative of the reference bearing moment are labelled in the different figures with reference signs only differing in the first digit.

Thus, the curve 413 illustrated in FIG. 4 may represent the value 113 of the pitch speed as output by the arrangement 100 or may represent the quantity 213 as output by the pitch rate limitation module 223 illustrated in FIG. 2.

FIG. 4 represents one particular instance in time. The figure may change over time. The value 409 indicates a reference quantity indicative of a reference bearing moment. The reference beam is also referred to as M_ref. To the left of M_ref, the moment value M_ref−ΔM_low is indicated and to the right of the reference moment, the quantity M_ref+ΔM_high is indicated. On the ordinate, the reference speed v_ref as well as the maximal pitch speed v_max and the minimal pitch speed v_min are indicated.

As can be appreciated from FIG. 4, the curve 413 representing the value of the pitch speed as calculated or determined according to embodiments of the present invention is a straight line defined for example by the points (M_ref−ΔM_low, v_max) and the point (M_ref, v_ref) or the point (M_ref+ΔM_high, v_min), for example. As can be seen from FIG. 4, at the M_ref−ΔM_low, the pitch speed 413 is maximal, namely v_max. Also, for bending or bearing moments lower than the value M_ref−ΔM_low, the speed may be kept at the maximal speed v_max. As can be seen from FIG. 4, when the bearing moment M is above the reference value M_ref, the pitch speed 413 is below the reference pitch speed v_ref which may also be identified as a collective pitch speed.

At least for bearing moments above the reference moment M_ref, the curve 413 may apply both during decrease or increase of the respective bearing moment. Thus, for an increase of the bearing moment, the curve 403 would be traversed in the direction of arrow 414, while for a decrease of the bearing moment with time, the curve 413 would be traversed in the direction of arrow 416.

Thus, for decreasing bearing moments according to direction 416, the pitch speed 413 would be increased subject to be below the reference pitch speed v_ref, if the bearing moment M is above the reference moment M_ref. Conversely in the case of an increase of the bending moment with time (following the direction 414 in FIG. 4), the pitch speed is determined to decrease over time such that the speed 413 is below the reference speed v_ref if the moment M is above the reference moment M_ref.

In the case, the bearing moment M is detected to be below the reference moment M_ref, the pitch speed 413 is determined to be above the reference pitch speed v_ref.

As can be seen from FIG. 4, the straight curve 413 has a negative slope.

Curve 450 in FIG. 4 represents the pitch speed according to conventional art that exhibits high values for large bending moments causing bearing damage.

According to embodiments of the present invention, a significant part of the catchup behaviour (to reduce the deviation between the actual pitch angle and a target pitch angle) may be moved from just above or at the mean level of the bearing moment to below the mean bearing moment. Since the damage is a relation of the pitch bearing moment, the pitch bearing damage may therefore significantly be lowered in embodiments of the present invention. That means, it is possible to stay within the bearing capacity thereby, bearing size can be reduced. Furthermore, risk of bearing failure may be reduced significantly in embodiments of the present invention. A bearing failure conventionally requires a lot of maintenance effort.

Instead of using bearing moment values as input values 103, 109 in FIG. 1, alternatively or additionally rotor azimuths may be utilized. The bending moment or the bearing moment may be highest when the blade is pointing upwards and lowest when the blade is pointing downwards. The exact shape or dependency may depend on environmental conditions. Measurement of blade bending moments or blade bearing moments may be used to find the rotor azimuths with highest and lowest bending moment or bearing moment. The azimuthal angle with highest and lowest bearing moment or bending moment would need to be continuously updated to account for changes in environmental conditions. Once the azimuth angle depending bending moment or bearing moment is known (for example by a look-up table or a mathematical function) it is then possible to schedule pitch activity based on this similar manner, i.e., to set the pitch speed accordingly.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of determining a value of a pitch speed for a pitch actuator of a rotor blade of a wind turbine and adjusting a pitch angle of the rotor blade, the method comprising:
providing a quantity being indicative of a value of a bearing moment of the rotor blade;
determining the value of the pitch speed based on the quantity and a reference quantity indicative of a reference value of the bearing moment of the rotor blade,
wherein, when the quantity indicates that the value of the bearing moment of the rotor blade is below the reference value of the bearing moment of the rotor blade,
the value of the pitch speed is determined to be above a reference value of the pitch speed,
wherein the value of the pitch speed is determined based on a parameter related to a low value of the bearing moment,
wherein the parameter related to the low value of the bearing moment indicates at which bearing moment the value of the pitch speed should be a maximal value of the pitch speed; and
adjusting, by the pitch actuator, the pitch angle of the rotor blade based on a target pitch angle and the determined value of the pitch speed.

2. The method according to claim 1, wherein the value of the pitch speed is determined to be the maximal value of the pitch speed at $$M<=M\_ref-\Delta AM\_low,$$

wherein
M is the value of the bearing moment,
M_ref is the reference value of the bearing moment,
ΔM_low is the parameter related to the low value of a bearing moment.

3. The method according to claim 1, wherein, if the quantity indicates that the value of the bearing moment of the rotor blade is above the reference value of the bearing moment of the rotor blade,
the value of the pitch speed is determined to be below the reference value of the pitch speed.

4. The method according to claim 1, wherein, if the quantity indicates decrease of the value of the bearing moment with time and if the quantity indicates that the value of the bearing moment of the rotor blade is above the reference value of the bearing moment of the rotor blade,
the value of the pitch speed is determined to increase with time, from a minimal speed value, such that the value of the pitch speed is below the reference value of the pitch speed.

5. The method according to claim 1, wherein, if the quantity indicates increase of the value of the bearing moment with time and if the quantity indicates that the value of the bearing moment of the rotor blade is above the reference value of the bearing moment of the rotor blade,
the value of the pitch speed is determined to decrease with time such that the value of the pitch speed is below the reference value of the pitch speed.

6. The method according to claim 1, wherein for increase and/or decrease of the value of the bearing moment with time the value of the pitch speed is determined to be above the reference value of the pitch speed, if the quantity indicates that the value of the bearing moment of the rotor blade is below the reference value of the bearing moment of the rotor blade.

7. The method according to claim 1, wherein the value of the pitch speed is determined to vary with the value of the bearing moment as a curve having negative derivative, for values of the bearing moment above and/or below the reference value of the bearing moment.

8. The method according to claim 7, wherein the curve is a straight line having a slope that is, dynamically, calculated such that $$v=v\_max \text{ for } M=M\_low \text{ and}$$

$$v=v\_min \text{ for } M=M\_high$$

wherein $$M\_low=M\_ref-\Delta M\_low,$$

$$M\_high=M\_ref+\Delta M\_high,$$

M is the value of the bearing moment,
v is the value of the pitch speed,
v_max is the maximal value of the pitch speed,
v_min is a minimal value of the pitch speed,
M_ref is the reference value of the bearing moment,
ΔM_low, ΔM_high are predetermined parameters related to the bearing moment.

9. The method according to claim 1,
wherein the rotor blade is one of a plurality of rotor blades;
wherein the reference value of the bearing moment of the rotor blade is a predetermined value or a mean of values of bearing moments of all of the rotor blades of the wind turbine; and/or
wherein the reference value of the pitch speed is a predetermined value of the pitch speed or a mean of values of the pitch speed of all of the rotor blades of the wind turbine.

10. The method according to claim 1,
wherein the quantity being indicative of the value of the bearing moment comprises at least one of:
a value of a strain of the rotor blade measured at at least one location of the rotor blade;
a value of a bending moment, calculated based on the value of the strain;
the value of a bearing moment, calculated based on the value of the strain and/or the bending moment;
a value of an azimuthal position of the rotor blade.

11. A method of controlling a pitch actuator, the method comprising:
supplying a signal indicative of the target pitch angle to the pitch actuator;
performing the method of determining the value of the pitch speed for the pitch actuator of the rotor blade of the wind turbine according to claim 1; and
supplying a signal indicative of the determined value of the pitch speed to the pitch actuator to control the pitch actuator.

12. An arrangement for determining a value of a pitch speed for a pitch actuator of a rotor blade of a wind turbine, the arrangement comprising:
a processor, configured to:
receive a quantity being indicative of a value of a bearing moment of the rotor blade;
determine the value of the pitch speed based on the quantity and a reference quantity indicative of a reference value of the bearing moment of the rotor blade,
wherein, when the quantity indicates that the value of the bearing moment of the rotor blade is below the reference value of the bearing moment of the rotor blade,
the value of the pitch speed is determined to be above a reference value of the pitch speed, wherein the value of the pitch speed is determined based on a parameter related to a low value of the bearing moment, wherein the parameter related to the low value of the bearing moment indicates at which bearing moment the value of the pitch speed should be a maximal value of the pitch speed; and output a signal for adjusting a pitch angle of the rotor blade based on a target pitch angle and the determined value of the pitch speed.

13. A pitch adjustment system, comprising:

the arrangement for determining the value of the pitch speed for the pitch actuator of the rotor blade of the wind turbine according to claim 12;

the pitch actuator communicatively coupled to the arrangement;

further comprising at least one sensor, adapted to determine the quantity being indicative of the value of the bearing moment of the rotor blade.

14. The pitch adjustment system of claim 13, wherein the at least one sensor is a strain sensor.

15. A wind turbine, comprising:

a turbine rotor having plural rotor blades attached; and the pitch adjustment system according to claim 13.

* * * * *